Nov. 30, 1954   R. S. BRESCKA ET AL   2,695,480
ARTICLE SUPPORTING APPARATUS FOR GRINDING MACHINES
Filed Sept. 7, 1951
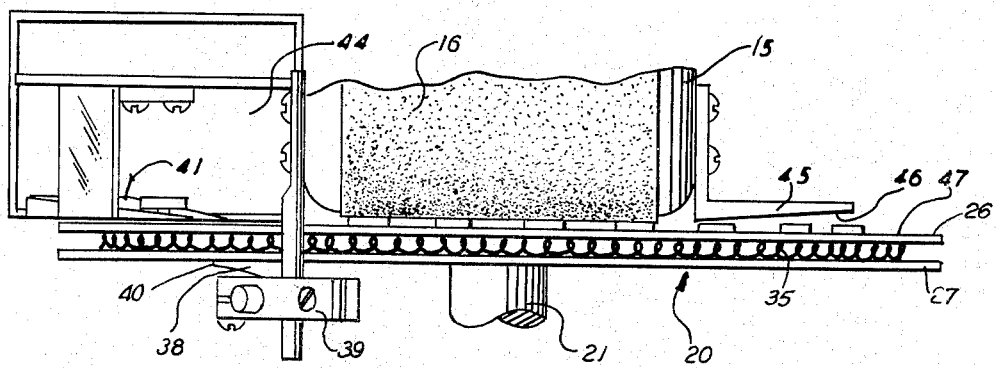
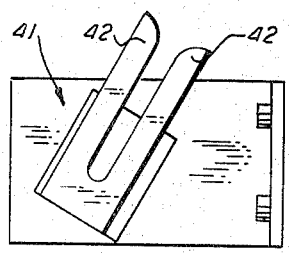
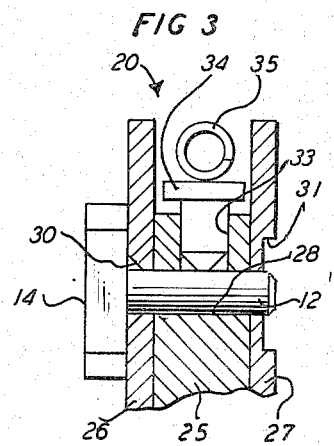
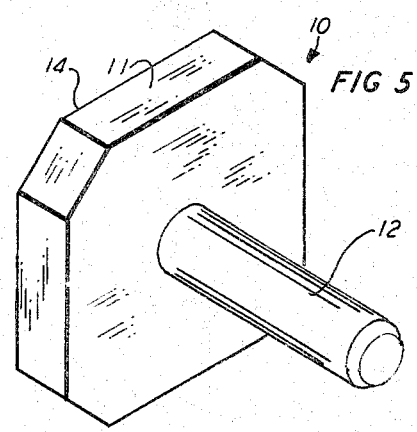
INVENTORS
R. S. BRESCKA
H. H. MERWIN

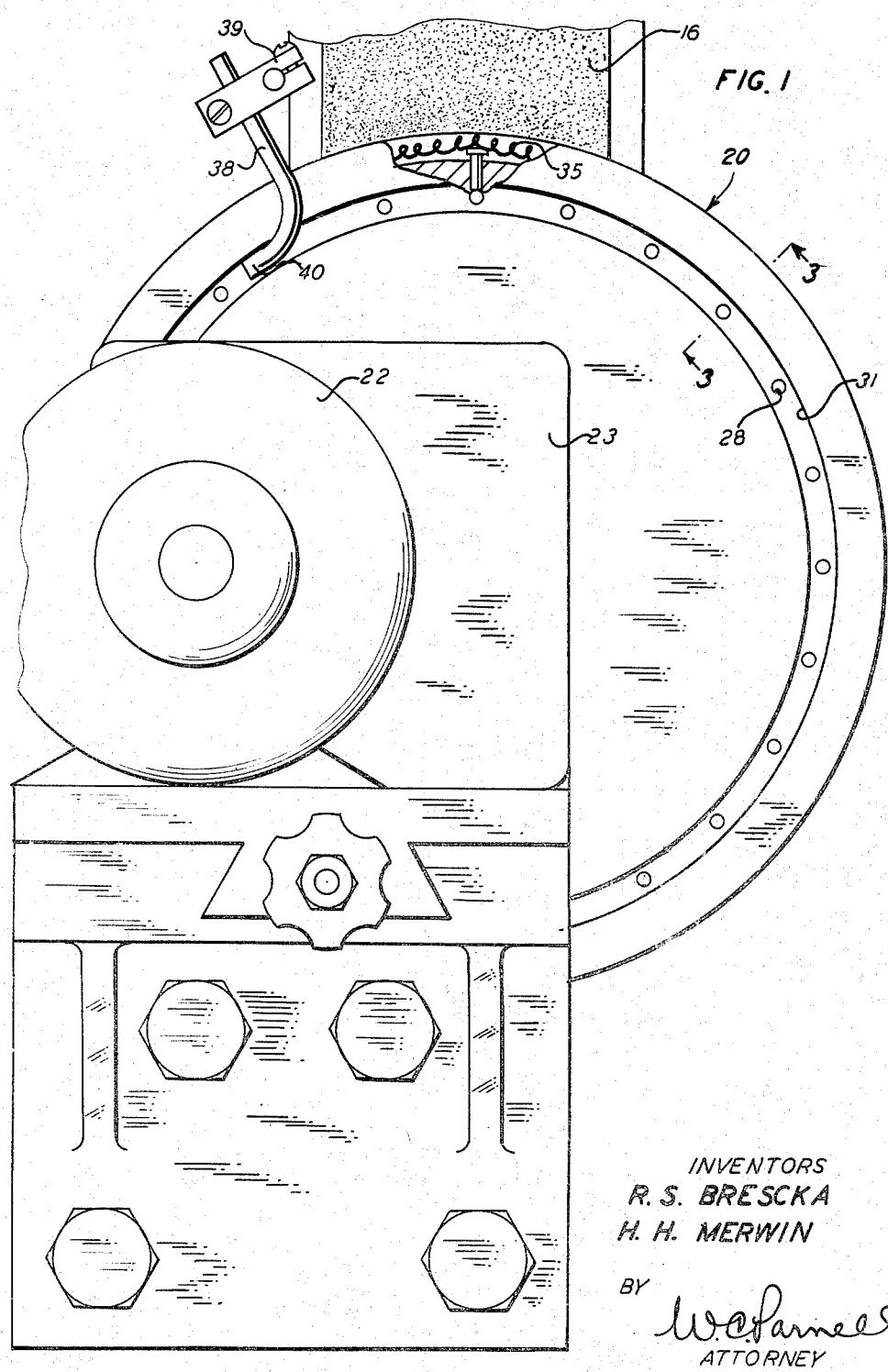

United States Patent Office 2,695,480
Patented Nov. 30, 1954

2,695,480

ARTICLE SUPPORTING APPARATUS FOR GRINDING MACHINES

Rudolph S. Brescka, Newark, and Harry H. Merwin, Rutherford, N. J., assignors to Western Electric Company, Incorporated, New York, N. Y., a corporation of New York Application September 7, 1951, Serial No. 245,534

2 Claims. (Cl. 51—145)

This invention relates to article grinding apparatus and more particularly to apparatus for grinding faces of number plates.

During the manufacture of certain types of articles, such as number plates composed of head portions mounted on pin-like elements, the head portions may be of greater thicknesses than desired or contain irregularities in their faces which must be removed leaving a smooth surface to receive the indicia subsequently placed thereon.

It is the object of the present invention to provide an apparatus which is simple in structure, yet highly efficient in successively receiving and moving articles in given paths relative to a grinding element.

With this and other objects in view, the invention comprises a grinding apparatus in combination with a grinding element movable in a given plane, the apparatus including a wheel mounted for rotation on its axis with a surface lying in a plane parallel to the plane of the grinding element. The wheel has spaced apertures to singly receive projections of articles to move the articles with the wheel relative to the grinding element. The wheel includes retaining elements adjacent the apertures urged into engagement with the projections of the articles to hold the articles against displacement during the grinding operation. At one side of the wheel, a member engages the projection of each finished article to move the head portions into engagement with ejecting means.

Other objects and advantages will be apparent from the following detailed description when considered in conjunction with the accompanying drawings wherein:

Fig. 1 is a side elevational view of the apparatus shown in conjunction with a sanding belt;

Fig. 2 is a fragmentary top plan view of the apparatus;

Fig. 3 is an enlarged fragmentary sectional view taken along the line 3—3 of Fig. 1;

Fig. 4 is a front elevational view of a portion of the ejecting means; and

Fig. 5 is an enlarged isometric view of one of the articles.

Referring now to the drawings, attention is first directed to Fig. 5 which illustrates an article 10 to be ground including a head 11 and a pin-like projection 12 perpendicular to the head. Articles of this kind are commercially known as number plates and are to receive numbers or other indicia on the face 14 thereof.

The apparatus is to be mounted adjacent a grinding unit 15 having a grinding element in the form of a sanding belt 16 traveling at a given linear speed in a predetermined plane.

The apparatus includes a wheel 20 mounted for rotation on a shaft 21 which is driven at a desired speed in a counterclockwise direction, Fig. 1, through the energization of a motor 22 which drives an intermediate speed reducing unit 23. In the present embodiment of the invention, the wheel 20 is composed of a central member 25 and side members 26 and 27. These members are provided with equally spaced groups of aligned apertures 28 to receive the projections 12 of the articles. Each aperture in the member 26 has an outwardly flared outer portion 30 to facilitate in guiding the articles into position with their projections 12 extending through the apertures 28. The member 27 has an annular groove 31 extending through the apertures therein for a purpose hereinafter described. Each aperture 28 in the central member 25, has a radially extending aperture 33 to receive a pin 34 whose function it is to engage the projection 12 of the article disposed in the adjacent aperture and through the force applied thereto by a spring 35, hold the successive articles against displacement. The spring 35 is of a helical structure housed in the annular groove in the periphery of the wheel between the extending portions of the sides 26 and 27 with its ends connected together under tension to apply like forces to each of the pins 34.

An ejecting element 38 is carried by a bracket 39 on a frame structure with the inner end 40 thereof positioned to ride in the annular groove 31. A fixedly mounted companion ejecting element 41 (Fig. 2) is shown in detail in Fig. 4 with leg portions 42 relatively thin at their outer ends and increasing in thickness to act as wedges beneath the head 11 of each article to remove them from the wheel. The ejecting elements 38 and 41 are mounted beyond the sanding belt 16 adjacent a chute type structure 44 down which the ejected finished articles may travel into a suitable receptacle.

At the other side of the sanding belt, a cam like arm 45 is mounted at a fixed position and provided with a surface 46 extending diagonally toward the wheel to move the articles 10 into close engagement with the surface 47 of the wheel prior to their movement into engagement with the grinding element or sanding belt 16.

Considering now the operation of the apparatus, let it be assumed that an operator positioned in front of the apparatus is supplied with numerous articles 10 and that the wheel 20 is driven clockwise, Fig. 1, at a speed permitting the operator to feed the articles singly to the successive apertures of the wheel, the articles are placed in the apertures from the same side of the wheel, the tapered inner ends of the pins 34 permitting the operator to readily move the projections 12 of the articles into proper positions where they are held by the respective pins 34 under the force of the spring 35. If the operator should fail to position any article so that its head 11 will not be in close engagement with the surface 47 of the wheel, the element 45 will function to accomplish this result. The articles are moved relative to the sanding belt and firmly held against the plane of the surface 47 so that the articles will be uniformly finished when they travel beyond the belt.

After leaving the area of the belt, the ends of the projections 12 extending into the annular groove 31 will engage the ejecting element 38 and be forced outwardly a given distance which is sufficient for the heads of each article to engage the companion ejecting element 41 and be moved outwardly free of the wheel as the articles are moved with the wheel. The ejected articles travel down the chute 44 into a receptacle.

The articles, in traveling through the grinding portion of the operating cycle are finished uniformly, the heads of the articles traveling relative to the sanding belt in a given path controlled by the plane of the surface 47 against which the articles rest.

It is to be understood that the above described arrangements are simply illustrative of the application of the principles of the invention. Numerous other arrangements may be readily devised by those skilled in the art which will embody the principles of the invention and fall within the spirit and scope thereof.

What is claimed is:

1. An apparatus, in combination with a grinding element having a grinding surface movable in a given plane, for grinding faces of articles having projections from the opposite sides of the articles and substantially perpendicular to their respective faces, the apparatus comprising a wheel driven about its axis and having a locating surface lying in a plane parallel with the plane of the grinding element and spaced from the grinding element a distance equal to the final thickness to which the articles are to be ground, the wheel having laterally extending apertures therein disposed at spaced positions short of the periphery thereof to receive the projections of the articles to support the articles and move them relative to the grinding element to cause the faces of the articles to be ground uniformly, a surface of the wheel opposing the locating surface having an annular groove therein into which the projections of the articles extend, means to force the articles into close engagement with the locating surface prior to their movement into engagement with the grinding surface, a stationary ejecting element extending into the groove to be engaged by the projections to move them longitudinally in their apertures to move their articles free of the locating surface after they are ground, and an ejecting member with a tapered surface to engage the ground articles singly and complete the ejection of the articles from the wheel.

2. An apparatus, in combination with a grinding element having a grinding surface movable in a given plane, for grinding faces of articles having projections from the opposite sides of the articles and substantially perpendicular to their respective faces, the apparatus comprising a wheel driven about its axis and having a locating surface lying in a plane parallel with the plane of the grinding element and spaced from the grinding element a distance equal to the final thickness to which the articles are to be ground, the wheel having laterally extending apertures therein disposed at spaced positions short of the periphery thereof to receive the projections of the articles to support the articles and move them relative to the grinding element to cause the faces of the articles to be ground uniformly, a surface of the wheel opposing the locating surface having an annular groove therein into which the projections of the articles extend, means to force the articles into close engagement with the locating surface prior to their movement into engagement with the grinding surface, the wheel also having a peripherial groove therein and apertures extending radially from the innermost surface to the peripherial groove to the laterally extending apertures, pin-like retaining elements with tapered inner ends disposed in the radially extending apertures to engage the projections of the articles, and a flexible member disposed in the peripherial groove and circumventing the wheel to force the retaining elements against the articles, a stationary ejecting element extending into the groove to be engaged by the projections to move them longitudinally in their apertures to move their articles free of the locating surface after they are ground, and an ejecting member with a tapered surface to engage the ground articles singly and complete the ejection of the articles from the wheel.

References Cited in the file of this patent

UNITED STATES PATENTS

| Number | Name | Date |
|---|---|---|
| 404,787 | Henderson | June 4, 1889 |
| 502,174 | Covert et al. | July 25, 1893 |
| 620,184 | Rodler | Feb. 28, 1899 |
| 652,418 | Beck | June 26, 1900 |
| 751,791 | Haskins | Feb. 9, 1904 |
| 1,017,880 | Landis | Feb. 20, 1912 |
| 1,147,830 | Tunich | July 27, 1915 |
| 1,264,928 | Heim | May 7, 1918 |
| 1,393,668 | Cummings | Oct. 11, 1921 |
| 1,481,242 | Mueller | Jan. 15, 1924 |
| 1,881,244 | Raule | Oct. 4, 1932 |
| 1,882,447 | Raule | Oct. 11, 1932 |
| 2,527,804 | Flygare et al. | Oct. 31, 1950 |

UNITED STATES PATENTS

| Number | Name | Date |
|---|---|---|
| 618,962 | Germany | Jan. 18, 1934 |